United States Patent
Krause

(10) Patent No.: US 10,394,216 B2
(45) Date of Patent: Aug. 27, 2019

(54) METHOD AND SYSTEM FOR CORRECTING A PROCESSING PATH OF A ROBOT-GUIDED TOOL

(71) Applicant: KUKA Deutschland GmbH, Augsburg (DE)

(72) Inventor: Jochen Krause, Nuremberg (DE)

(73) Assignee: KUKA Deutschland GmbH, Augsburg (DE)

( * ) Notice: Subject to any disclaimer, the term of this patent is extended or adjusted under 35 U.S.C. 154(b) by 197 days.

(21) Appl. No.: 15/528,364

(22) PCT Filed: Nov. 18, 2015

(86) PCT No.: PCT/EP2015/002304
§ 371 (c)(1),
(2) Date: May 19, 2017

(87) PCT Pub. No.: WO2016/078760
PCT Pub. Date: May 26, 2015

(65) Prior Publication Data
US 2017/0371314 A1 Dec. 28, 2017

(30) Foreign Application Priority Data
Nov. 21, 2014 (DE) .................. 10 2014 017 307

(51) Int. Cl.
*G05B 19/27* (2006.01)
*B25J 9/16* (2006.01)
(Continued)

(52) U.S. Cl.
CPC ............ *G05B 19/27* (2013.01); *B25J 9/1664* (2013.01); *G05B 19/0426* (2013.01);
(Continued)

(58) Field of Classification Search
None
See application file for complete search history.

(56) References Cited

U.S. PATENT DOCUMENTS 4,380,696 A * 4/1983 Masaki ................ B25J 19/023
219/124.34
4,642,752 A * 2/1987 Debarbieri .......... B23K 9/1274
219/124.34
(Continued)

FOREIGN PATENT DOCUMENTS

DE 3143834 A1 6/1982
DE 3144843 A1 6/1982
(Continued)

OTHER PUBLICATIONS

German Patent Office; Examination Report in related German Patent Application No. 10 2014 017 307.0 dated Dec. 13, 2018; 6 pages.
(Continued)

*Primary Examiner* — Jason Lin
(74) *Attorney, Agent, or Firm* — Dorton & Willis, LLP

(57) ABSTRACT

A method for correcting the processing path of a robot-guided tool for processing at least one component, wherein: a target position for a plurality of points of a target processing path is specified; from the specified points, points to be corrected are selected; the actual position for the selected points to be corrected is measured or detected on at least one component to be processed; and the processing path corresponding to the measured or detected actual position of the points of the component to be processed is correspondingly corrected. The method is suitable, for example, for welding a component into a borehole using a laser beam, wherein the processing path of the laser beam is corrected so as to correspond to the contour of the component.

13 Claims, 1 Drawing Sheet

(51) Int. Cl.
*G05B 19/401* (2006.01)
*G05B 19/042* (2006.01)

(52) U.S. Cl.
CPC .. *G05B 19/401* (2013.01); *G05B 2219/31081* (2013.01); *G05B 2219/36043* (2013.01); *G05B 2219/36087* (2013.01); *G05B 2219/36517* (2013.01); *G05B 2219/40519* (2013.01)

(56) References Cited

U.S. PATENT DOCUMENTS

| | | | | |
|---|---|---|---|---|
| 5,570,458 | A | 10/1996 | Umeno et al. | |
| 6,596,961 | B2 * | 7/2003 | Ehlers | B23K 26/03 219/121.63 |
| 7,130,718 | B2 | 10/2006 | Gunnarsson et al. | |
| 8,036,776 | B2 * | 10/2011 | Hellberg | B25J 9/1674 700/245 |
| 8,700,202 | B2 * | 4/2014 | Kahle | G01S 5/0221 342/450 |
| 2004/0093119 | A1 * | 5/2004 | Gunnarsson | B25J 9/1638 700/245 |
| 2004/0249495 | A1 * | 12/2004 | Orozco | B23K 26/03 700/166 |
| 2006/0271240 | A1 * | 11/2006 | Nihei | B25J 9/1664 700/245 |
| 2009/0302011 | A1 * | 12/2009 | Behr | B23K 26/04 219/121.64 |
| 2015/0205285 | A1 * | 7/2015 | Hiruma | G05B 19/19 700/159 |
| 2015/0290735 | A1 * | 10/2015 | Beattie | B23K 9/0325 700/166 |

FOREIGN PATENT DOCUMENTS

| | | |
|---|---|---|
| DE | 19615069 A1 | 10/1997 |
| DE | 10039442 A1 | 2/2002 |
| DE | 102005051533 A1 | 8/2006 |
| DE | 102005047204 A1 | 4/2007 |
| DE | 60129009 T2 | 3/2008 |
| EP | 0353585 A2 | 2/1990 |
| EP | 0361663 A2 | 4/1990 |
| EP | 2325711 A1 | 5/2011 |

OTHER PUBLICATIONS

European Patent Office; Search Report in International Patent Application No. PCT/EP2015/002304 dated Feb. 12, 2016; 6 pages.
German Patent Office; Examination Report in German Patent Application No. 10 2014 017 307.0 dated May 26, 2015; 5 pages.
Korean Patent Office; Office Action in related Korean Patent Application No. 10-2017-7013464 dated May 30, 2018; 10 pages.

* cited by examiner

METHOD AND SYSTEM FOR CORRECTING A PROCESSING PATH OF A ROBOT-GUIDED TOOL

CROSS-REFERENCE

This application is a national phase application under 35 U.S.C. § 371 of International Patent Application No. PCT/EP2015/002304, filed Nov. 18, 2015 (pending), which claims the benefit of German Patent Application No. DE 10 2014 017 307.0 filed Nov. 21, 2014, the disclosures of which are incorporated by reference herein in their entirety.

TECHNICAL FIELD

The present invention concerns a method and a system for processing at least one component with a robot-guided tool, as well as a computer program product for implementing the method.

BACKGROUND OF INVENTION

Specifying target positions for a plurality of points of a processing path is known from in-house experience, wherein an offset of the component relative to a reference position is determined prior to traversing the processing path, and all target positions are transformed with this standard offset.

SUMMARY

The object of the present invention is to improve the processing at of least one component with a robot-guided tool.

According to one aspect of the present invention, a method for processing at least one component with a robot-guided tool comprises the steps:
  a) specifying one respective target position for a plurality of points of a processing path;
  b) selecting points to be corrected from among the predefined points;
  c) determining one respective actual position for the selected points on at least one component to be processed; and
  d) traversing the processing path on the basis, i.e. as a function, of the determined actual positions.

In one embodiment, points of the processing path can thus be corrected individually in a targeted manner. As a result, in one design, localized deformations of components in particular can advantageously be taken into account individually as well.

According to one aspect of the present invention, a system with a robot-guided tool for processing at least one component is correspondingly configured, in particular in terms of hardware and/or software, for implementing a method described herein. In one embodiment it comprises a means for specifying one respective target position for a plurality of points of a processing path, a means for selecting points to be corrected from the predefined points, a means for determining one respective actual position for the selected points on at least one to component be processed, and a means for traversing the processing path on the basis of the determined actual positions.

A means in the sense of the present invention can be configured in terms of hardware and/or software, in particular a digital processing unit, in particular a microprocessor unit, (CPU), which is preferably data- or signal-connected with a memory and/or bus system, and/or comprises one or more programs or program modules. The CPU can be configured to process commands, which are implemented as a program stored in a memory system, acquire input signals from a data bus and/or deliver output signals to a data bus. A memory system may comprise one or more, in particular different, memory media, in particular optical, magnetic, solid state and/or other non-volatile media. The program may be such that it embodies, i.e. is capable of executing, the methods described herein, so that the CPU can execute the steps of such methods and can thus in particular process at least one component with a robot-guided tool, or can control a robot for processing at least one component with a robot-guided tool. A robot in the sense of the present invention is in particular a universally usable or specialized motion automaton with multiple, in particular at least three, axes, the movements of which, in particular with respect to motion sequence and/or paths and/or angles, are in particular free, in particular programmable without mechanical, in particular human intervention, and optionally sensor-guided, or a programmable specialized or general purpose handling device for moving material, workpieces, tools or special equipment.

In one embodiment, the processing path is a welding line; the tool is correspondingly a robot-guided welding head or a component holder for guiding the component past a welding head that is in particular fixed with respect to its surroundings. In another embodiment, the processing path is a painting line; the tool is correspondingly a robot-guided sprayer head or a component holder for guiding the component past a sprayer head that is in particular fixed with respect to its surroundings. Alternatively, the processing path may also be found in an application such as bonding, coating, application of agents, substances or the like to components and joining processes. Joining processes are in particular all processes in which at least two components are detachably or permanently connected to one another, for example by clamping, screwing, welding, soldering, forming, crimping, press-fitting, riveting, bonding or the like.

The processing may also be a material removal process, in particular cutting, grinding, milling, drilling, or the like; the robot-guided tool correspondingly a robot-guided cutting, grinding, milling or drilling head or the like.

In one embodiment, one or more of the target positions are defined by moving toward the points, in particular on a reference component, and storing the resulting positions.

In one embodiment, one or several of the points, in particular those to be corrected, are selected in a processing program, in particular (already) prior to the processing of the component, in particular by selecting from a list or including in a list, marking, or the like. In a further development, instructions for determining the actual positions of predefined points of the processing path are provided or can be entered or are entered in the processing program, in particular a measuring program (within) the processing program, whereby these points are selected in the sense of the present invention. This allows the user to individually select points to be corrected in a simple and targeted manner.

In a further development, all predefined points are (pre)selected by default. A customization of the processing path to the respective component that is as precise as possible can thus be preset as a default. In another further development, none of the predefined points are (pre)selected by default. Rapid processing with little measurement effort can thus be pre-set as a default. In another further development, several of the predefined points are (pre)selected by default in accordance with a predefined, in particular parameterizable, specification, for example every second, third, $n^{th}$ point, etc.

A compromise between rapid processing with little measurement effort and customization of the processing path to the respective component that is as precise as possible can thus be preset as a default.

Correspondingly, the means for selecting points to be corrected from the predefined points in one design comprises an input option for entering points to be corrected.

In one embodiment, one or more of the actual and/or target positions comprise a one, two or three-dimensional location or a one, two or three-dimensional distance to a reference point, that is in particular fixed with respect to its surroundings and/or the robot.

Additionally, or alternatively, one or more of the actual and/or target positions in one design comprise a one, two or three-dimensional direction or a one, two or three-dimensional orientation relative to a reference, that is in particular fixed with respect to its surroundings and/or the robot, in particular a reference direction or a reference coordinate system.

In a further development, one or more of the actual positions comprise surface normal and/or defined, in particular vertical or predeterminable, directions relative to a contour, in particular one or more, in particular opposite, edges of the component. Additionally, or alternatively, one or more of the target positions in a further development comprise tool directions or orientations, in particular an impact direction, optical axis or the like.

By specifying target positions for a processing path, which respectively comprise a tool direction or orientation, determining actual positions of the points on the component to be processed, which respectively comprise a surface normal and/or predefined directions relative to a contour, and traversing the processing path on the basis of this determined actual position, a direction or orientation of the tool relative to the component can be individually customized as well.

In one embodiment, the coordinates of the actual positions to be determined are selectable or the coordinates of the actual positions to be determined are selected. Correspondingly, in one embodiment, the means for selecting points to be corrected from the predefined points comprises an input option for entering a selection of coordinates of the actual positions to be determined.

In a further development, the user can therefore select whether one or more position coordinates and/or one or more direction or orientation coordinates of the respective actual position are or should be determined, or whether the processing path is or should be traversed on the basis of these determined coordinates, in particular whether these coordinates of the target positions are or should be replaced with these, possibly transformed, coordinates of the actual positions. For example, in one embodiment, the user can select whether a determined actual position comprises only (one or more) position coordinates, only (one or more) orientation coordinates or both position and orientation coordinates. Accordingly, in one embodiment, an actual position selectively comprises different coordinates.

In one embodiment, the target positions for one or more of the selected points are replaced on the basis of the determined actual positions for these points, and the processing path is traversed on the basis of this target position. In a further development, predefined target positions are replaced with determined actual positions, in particular overwritten in a memory. Additionally, or alternatively, in a further development, target directions are replaced, in particular overwritten in a memory, by corrected directions, which are determined on the basis of the determined actual directions, in particular by transformation. If, for example, a tool direction with a surface normal is to include a predefined angle, and if an actual surface normal is determined for the selected points, one corrected tool direction, which replaces the original target tool direction, can respectively be determined by transforming this actual surface normal.

By replacing predefined target values on the basis of the determined actual values, in particular by the determined, possibly transformed, actual values, in one design a complex additional transformation, in particular during processing, can advantageously be avoided.

In one embodiment, one or more of the actual positions are determined by means of triangulation, in particular laser-based triangulation. Alternatively, or additionally, other measurement methods for determining the actual positions can be used as well; for example measurements with a laser dot sensor or a tactile sensor, in particular a measuring probe, a welding wire, a gas nozzle seeking device or the like. A position, in particular a location and/or an orientation, can be determined in a particularly advantageous, in particular precise and/or non-contact manner.

Accordingly, in one embodiment, the means for determining one respective actual position for the selected points on the component to be processed comprises an in particular robot-guided sensor, in particular a laser sensor, for detecting points on the component to be processed by means of triangulation.

In one embodiment, one or more of the actual positions are determined in a partially or fully automated manner, in particular by means of a robot, in particular by means of the (already or subsequently) tool-guiding robot itself, in particular by moving toward the actual position or positions with a or the robot-guided, in particular optical or tactile, sensor, tool or the like.

Correspondingly, in one embodiment, the means for determining one respective actual position for the selected points is a means for the partially or completely automated determination of one respective actual position for the selected points, in particular by means of a robot, in particular by means of the (already or subsequently) tool-guiding robot itself, in particular by moving toward the actual position or positions with a robot-guided, in particular optical or tactile, sensor, tool or the like.

In one embodiment, the processing, in particular of a plurality of components, can thus be improved.

In one embodiment, a plurality of components, in particular of the same type or similar, are processed with the robot-guided tool, in particular in succession and/or in a completely or partially automated manner, whereby for these components in each case one respective actual position is determined for selected (to be corrected) points, in particular the (same) selected points on the respective component to be processed, in particular in a partially or completely automated manner, in particular by means of a or the robot, and the processing path is subsequently traversed, in each case on the basis of these component-specific (component-specifically determined) actual positions, for the purpose of processing that component. In a further development, the same target positions are predefined for the plurality of components.

Accordingly, in one embodiment, the means for determining one respective actual position of the selected points is a means for the in particular partially or completely automated determination, in particular by means of a or the robot, of one respective component-specific actual position for selected (to be corrected) points, in particular the (same) selected points, on a plurality of components, which are in particular of the same type or similar and/or are to be processed in succession with the robot-guided tool, and the means for traversing the processing path on the basis of the determined actual positions is a means for traversing the processing path in each case on the basis of the component-specific (component-specifically determined) actual positions for the purpose of processing the respective component, for the purpose of processing a plurality of components, in particular of the same type or similar, in particular in succession and/or in a completely or partially automated manner, with the robot-guided tool.

In particular, in one embodiment, Steps c) and/or d) are thus repeated for a plurality of components.

In this way, in one embodiment, the processing, in particular of a plurality of components, can be improved.

In one embodiment, one or more steps of the method are performed partially or completely i.e. without operator intervention; i.e. the corresponding means performs of the steps partially or completely i.e. without operator intervention.

BRIEF DESCRIPTION OF THE DRAWINGS

Further advantages and features emerge from the dependent claims and the design examples. For this purpose, partially in schematic form, the figures show:

DETAILED DESCRIPTION

Figure 1:
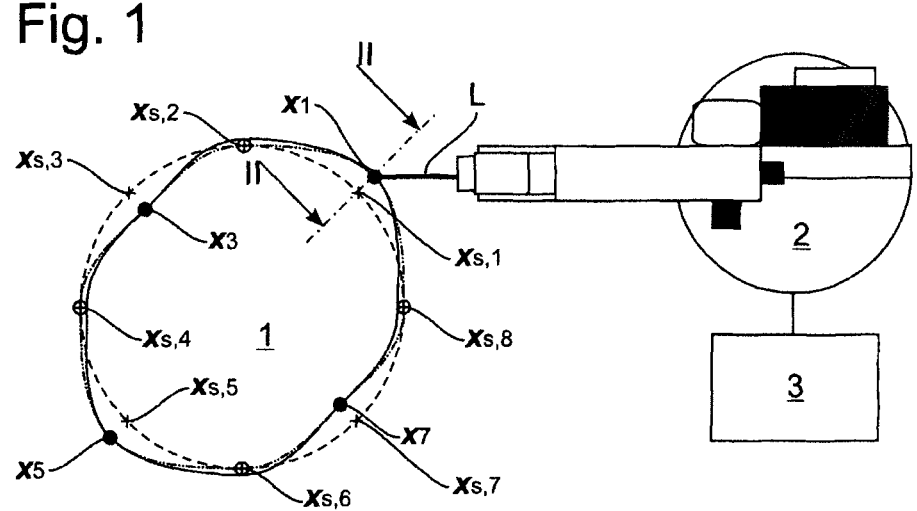
FIG. 1: a system in the process of machining at least a component according to an embodiment of the present invention.

FIG. 1 shows a system in the process of processing at least one component 1 according to an embodiment of the present invention.

The system comprises a robot 2 and a robot control system 3, which processes a processing program stored within itself. Of course, the process described in the following can also be performed by specialized, automated machines, for example by special "welding machines" used in welding technology. These machines should therefore also be included in the concept of robot in the sense of this invention.

In the embodiment example, an end face of component 1 is welded into a corresponding bore. For this purpose, the robot 2 scans a processing path with a laser beam L.

Figure 3:
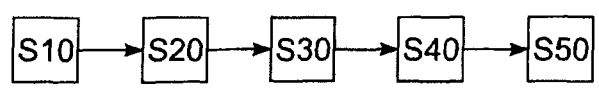
FIG. 3: the process of the method.

In a first Step S10 (see FIG. 3), target positions are defined for a plurality of support points $x_{s,i}$ to $x_{s,8}$ of the processing path; these are indicated in FIG. 1 by means of crosses. For this purpose, the points are moved toward a reference component, indicated in FIG. 1 with a dashed line, and the resulting positions are stored.

The positions respectively comprise a three-dimensional location and a three-dimensional tool direction i.e. direction of the optical axis of the laser head of the robot 2.

In a second Step S20, then, points to be corrected are selected from among the predefined points. In the embodiment, for example, these are the support points $x_{s,1}, x_{s,3}, x_{s,5}, x_{s,7}$. This selection takes place by providing an instruction for determining an actual position for each of these support points in the processing program.

Now, in a third Step S30, a component-specific actual position of points $x_1, x_3, x_5, x_7$ is determined in an automated manner by the processing program, by a robot-guided laser sensor (not shown) or another previously described sensor, for each of these selected points on the currently to be processed component, which is depicted with a solid line in FIG. 1, and adopted into the processing program in an automated manner, as indicated in FIG. 1 by means of solid circles.

Figure 2:
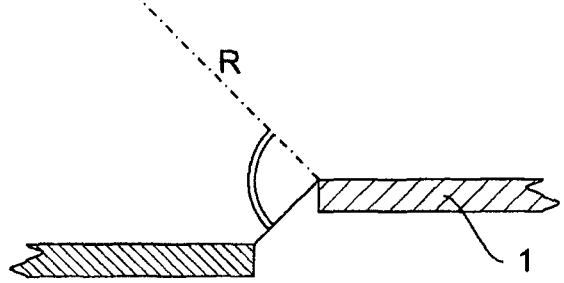
FIG. 2: a section along the line II-II in FIG. 1.

To do this, the three-dimensional actual locations of these points are determined. And a respective direction R, perpendicular or normal to opposite edges of component 1 is determined, as indicated in the section of FIG. 2. In a modification, the user can specify or have specified in the processing program, which coordinates of the actual position are determined or which coordinates the actual position comprises, for example, only the position coordinates.

Then, in a fourth Step S40, in the processing program stored in the robot control system 3, the target positions of the support points $x_1, x_3, x_5,$ and $x_7$ are replaced with the determined actual positions of points $x_1, x_3, x_5,$ or $x_7$ in an automated manner. The tool orientations, in particular the optical axes of the laser head, which are defined in the program for support points $x_{s,1}, x_{s,3}, x_{s,5},$ and $x_{s,7}$, are also replaced with corrected directions, which, with a predefined transformation, result from the determined actual directions R. In the embodiment, as an example, the optical axis of the laser head will be perpendicular to the weld seam. Therefore, as an example, an identical depiction is selected as the transformation, i.e. the predefined target tool orientation at points $x_{s,1}, x_{s,3}, x_{s,5},$ and $x_{s,7}$ is replaced with the determined direction R perpendicular to edges of the component 1.

In a fifth step S50, the processing path, which is defined by support points $x_{s,1}$-$x_{s,8}$ and indicated in FIG. 1 with dash-double-dot lines, is traversed by the laser beam L in an automated and robot-guided manner. The processing of the component is in particular performed by means of the laser beam; by the robot control system 3 appropriately controlling the robot 2.

As can be seen by comparing the dash-double-dotted processing path with the solid contour of component 1 and the dashed contour of the reference component, the processing path can thereby easily be customized to the actual contour of the currently to be processed component. On the other hand, by selecting support points, the actual position of which is determined, it is not necessary for all the support points of the processing path to be determined, which can reduce the complexity of measurement. Instead, in Step S20, points can individually be selected from among the predefined points of the processing path.

Together with the robot-guided laser sensor, the robot control system 3 forms a means for predefining one respective target position for a plurality of points of a processing path, a means for selecting points to be corrected from among the predefined points, a means for determining one respective actual position for the selected points on the component to be processed, and a means for traversing the processing path on the basis of the determined actual positions.

The robot control system 3 accordingly comprises an input option for entering points to be corrected.

If a plurality of identically constructed components 1 are processed in succession, Steps S30-S50 are repeated in an automated (component-specific) manner for each component. Steps S10, S20, however, are performed only once in advance for the components.

Even though exemplary designs have been outlined in the foregoing description, it should be noted that a variety of modifications are possible. In addition, it should be noted that the exemplary designs are merely examples that are by no means intended to limit the scope of protection, the applications and the structure in any way. Rather, with the foregoing description, the skilled person is provided with a guide for implementation of at least one exemplary embodiment, whereby a variety of changes, in particular with respect to the function and arrangement of the described components may be made without departing from the scope of protection as it is emerges from the claims and the equivalent combinations of features.

While the present invention has been illustrated by a description of various embodiments, and while these embodiments have been described in considerable detail, it is not intended to restrict or in any way limit the scope of the appended claims to such detail. The various features and steps shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

LIST OF REFERENCE SIGNS

1 Component
2 Robot
3 Robot control system
L Laser beam
R Direction
$x_{s,i}$ Predefined point
$x_i$ Point on the component

What is claimed is:

1. A method for processing at least one component with a robot-guided tool, the method comprising:
    specifying respective target positions for a plurality of points of a processing path;
    selecting points to be corrected from among the specified points, wherein the number of the selected points to be corrected is less than the number of the plurality of points of the processing path;
    determining a respective actual position for the selected points on at least one component to be processed;
    correcting only the selected points of the processing path based on the determined actual positions; and
    controlling the robot-guided tool to traverse the processing path on the basis of the determined actual positions.

2. The method of claim 1, wherein at least one of the positions comprises a direction.

3. The method of claim 1, wherein the coordinates of the actual positions to be determined are selectable.

4. The method of claim 1, further comprising:
    replacing the target position for at least one of the selected points with a new target position on the basis of the determined actual position for the point; and
    traversing the processing path is on the basis of the new target position.

5. The method of claim 1, wherein at least one of the actual positions is determined with the aid of at least one sensor by using triangulation.

6. The method of claim 5, wherein at least one of the actual positions is determined by laser-supported triangulation.

7. The method of claim 1, wherein at least one of the actual positions is determined in an automated manner using a robotic manipulator.

8. The method of claim 1, wherein at least one of the points to be corrected is selected in a processing program.

9. The method of claim 1, wherein for a plurality of components respectively, one actual position is determined for each selected point to be corrected, and in each case the processing path is traversed on the basis of the determined actual positions.

10. The method of claim 9, wherein the actual positions are determined at least partially in an automated manner.

11. A system with a robot-guided tool for processing at least one component, wherein the system is configured to:
    specify respective target positions for a plurality of points of a processing path;
    select points to be corrected from among the specified points, wherein the number of the selected points to be corrected is less than the number of the plurality of points of the processing path;
    determine a respective actual position for the selected points on at least one component to be processed;
    correct only the selected points of the processing path based on the determined actual positions; and
    control the robot-guided tool to traverse the processing path on the basis of the determined actual positions.

12. The system of claim 11, comprising:
    means for specifying respective target positions for a plurality of points of a processing path;
    means for selecting points to be corrected from among the specified points;
    means for determining a respective actual position for the selected at least one component to be processed; and
    means for traversing the processing path on the basis of the determined actual positions.

13. A computer program product including program code stored on a non-transitory computer-readable medium, the program code configured to, when executed on a computer, cause the computer to:
    specify respective target positions for a plurality of points of a processing path;
    select points to be corrected from among the specified points, wherein the number of the selected points to be corrected is less than the number of the plurality of points of the processing path;
    determine a respective actual position for the selected points on at least one component to be processed;
    correct only the selected points of the processing path based on the determined actual positions; and
    control a robot-guided tool to traverse the processing path on the basis of the determined actual positions.

* * * * *